UNITED STATES PATENT OFFICE.

CARL WACHENDORFF, OF OESTRICH, GERMANY, ASSIGNOR TO RUDOLPH KOEPP & CO., OF SAME PLACE.

DOUBLE SALTS OF FLUORIDE OF ANTIMONY AND SULPHATE OF AMMONIA.

SPECIFICATION forming part of Letters Patent No. 479,925, dated August 2, 1892.

Application filed November 23, 1891. Serial No. 412,839. (Specimens.) Patented in Germany April 6, 1890, No. 57,615.

*To all whom it may concern:*

Be it known that I, CARL WACHENDORFF, a subject of the King of Prussia, residing at Oestrich-on-the-Rhine, Germany, have invented a new and useful Improvements in the Manufacture of a Double Compound of Fluoride of Antimony and Sulphate of Ammonia, of which the following is a specification, and which has been patented with my consent in the German Empire by patent dated April 6, 1890, and numbered 57,615.

Fluoride of antimony has heretofore been produced by dissolving pure oxide of antimony in pure hydrofluoric acid. The requisite oxide necessary has been obtained, as is known, from crude antimony by heating with concentrated sulphuric acid; but the operations connected therewith are particular and involve many expenses and difficulties, as the crude antimony disintegrated by sulphuric acid is changed by water into basic sulphate of antimony. The latter is then converted, with great quantities of water and steam, into a most basic possible compound, neutralized with soda, and the oxide of antimony thus produced must finally again be freed by means of large quantities of water and steam from the sodium sulphate that has been formed.

According to the present invention, fluoride of antimony is produced in a hitherto-unknown double combination of fluoride of antimony and sulphate of ammonium in the simplest manner without expensive work. If the product of reaction obtained through the heating of crude antimony with sulphuric acid is poured into not too much water, a basic sulphate of antimony is produced of the composition $(Sb_2O_3).Sb_2(SO_4)_3$, which can easily be separated by decantation from the remaining acid liquid. Now this with ammonium bifluoride, according to the equation $$Sb_2O_3.Sb_2(SO_4)_3 + 6NH_4Fl.HFl = 2(SbFl_3)_2.3(NH_4)_2SO_4 + 3aq$$

is transposed evenly into the composition $$(SbFl_3)_2.1\tfrac{1}{2}(NH_4)_2SO_4.$$

For this it is only necessary to put the basic sulphate into the theoretical quantity of the ammonium bifluoride which is in aqueous solution, and then to heat it. On cooling off the combination named is crystallized. The same double salt may also be obtained, but, of course, more expensively if fluoride of antimony (produced by dissolving oxide of antimony in hydrofluoric acid) is charged with less than the theoretical quantity of ammonium sulphate for crystallization.

A double salt of fluoride of antimony and sulphate of ammonium is already known through the composition $SbFl_3.(NH_4)_2SO_4$, which is described in United States Letters Patent No. 407,925, dated July 30, 1889. That this is entirely different in its chemical composition from the new double salt is proven by the following analysis and combination:

|  | Found. | Calculated for $(SbFl_3)_2.1\tfrac{1}{2}(NH_4)_2SO_4$. | Calculated for $SbFl_3.(NH_4)_2SO_4$. |
|---|---|---|---|
| $Sb_2O_3$ | 52.7 | 52.2 | 46.6 |
| $HFl$ | .21 | 21.7 | 19.4 |
| $H_2SO_4$ | 27.1 | 26.4 | 31.7 |
| $NH_3$ | 8.5 | 9.7 | 11. |

The physical properties of the two are also entirely different, as shown by the following results of accurate estimation and measurements:

*Crystallographic examination of the compositions.*
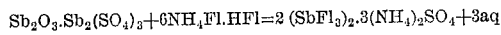

Combination:
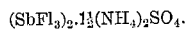

Crystal system: Rhombic.

a:b:c=0.6245:1:0.5008.

Combination:
$(SbFl_3)_2.1\tfrac{1}{2}(NH_4)_2SO_4.$

Crystal system: Hexagonal, Rhombohedral.
a:c=1:0.4413.

The combination $(SbFl_3)_2.1\tfrac{1}{2}(NH_4)_2SO_4$, as already indicated, has not yet been described in literature, in fact, in the Letters Patent No. 407,925, hereinbefore referred to, for the other antimony-salt in which the possibility of its existence is denied, for it is there stated that in the described sulphate combinations of fluoride of antimony it had not been possible to form a higher combination between fluoride of antimony and the sulphates of alkalies. The principal importance lies, therefore, in the fact that its molecular composition corresponds to a totally-new type, which hitherto had not been observed at all in the double combinations of antimony of which no analogy has been shown. Thus, also, in all hitherto-known double combinations of fluoride of antimony with alkali sulphates and alkali fluorides described by Fluckiger (*Ann. Chem. Pharm.*, 83, pp. 343 to 345,) and United States Letters Patent No. 407,925 the proportion of the numbers of the molecules (forming the double salts) of fluoride of antimony and the alkali salts is a different one.

The salt $SbFl_3.(NH_4)_2SO_4$, though in its component parts it is closely related to the new one, yet differs very decidedly through its wholly different quantative composition. Thus while the former salt corresponds to the type $SbFl_3.R_2SO_4$, R representing a metal of the alkali group, the new salt represents the following new type: $(SbFl_3)_2.1\frac{1}{2}R_2SO_4$.

As compared with the above-mentioned combination $SbFl_3.(NH_4)_2SO_4$, the new double salt offers very considerable advantages for production and use on a large scale.

For production, the use already referred to of basic sulphate of antimony, instead of pure oxide of antimony, is to be especially noted. Hereby not only is a considerable simplifying in manufacture and the apparatus necessary thereto made possible, but in connection therewith the new product may be manufactured more cheaply than was the case with the antimony-salt hitherto used, in the production of which one must always proceed from pure oxide of antimony and pure hydrofluoric acid. Furthermore, the manufacture in general is facilitated through the great stability of the combination. The combination $SbFl_3.(NH_4)_2SO_4$, even during the production from fluoride of antimony and sulphate of ammonium, under some circumstances changes into a modification insoluble in water, the sulphuric acid passing over to the antimony and the displaced hydrofluoric acid combining with the ammonia. My combination, on the other hand, is produced, as indicated, from basic antimony sulphate and ammonium bifluoride. The stability of the latter combination is also verified by the enormous capability for crystallization. Crystals eight to ten centimeters in length may be obtained with ease.

For use by dyers the first advantage is to be found in the solubility, which is much more considerable than in the salt $SbFl_3.(NH_4)_2SO_4$; and, furthermore, it is superior through the larger percentage of antimony it contains.

What I claim as my invention, and desire to secure by Letters Patent, is—

As an article of manufacture, the double compound of fluoride of antimony and sulphate of ammonia having the formula $(SbFl_3)_2.1\frac{1}{2}(NH_4)_2SO_4$, substantially as set forth.

In testimony whereof I have signed my name to this specification in the presence of two subscribing witnesses.

CARL WACHENDORFF.

Witnesses:
ALVESTO S. HOGUE,
EMIL ECKERT.